2,457,242
Patented July 22, 1969

3,457,242
ARYLENE SULFIDE POLYMER RECOVERY
Harold Wayne Hill, Jr., Bartlesville, Okla., assignor to Phillips Petroleum Company, a corporation of Delaware
No Drawing. Filed Aug. 22, 1966, Ser. No. 573,869
Int. Cl. C08g 23/00
U.S. Cl. 260—79          8 Claims

ABSTRACT OF THE DISCLOSURE

Arylene sulfide polymers are recovered from mixtures thereof with polar organic solvents and alkali metal halides by extraction of the polar organic solvent with a hydrocarbon solvent, washing the solid arylene sulfide polymer phase with an aqueous medium to remove inorganics, and reducing the temperature of the hydrocarbon-polar organic solvent mixture to resolve the two.

---

This invention relates to the recovery of polyarylene sulfides. In one aspect, a polyarylene sulfide is recovered by treating a mixture thereof with hydrocarbon solvents. In another aspect, polyarylene sulfides are separated from mixtures thereof with alkali metal halides and polar organic solvents by contacting with a hydrocarbon solvent. In another aspect, polar organic solvents are separated from mixtures thereof with alkali metal halide and polyarylene sulfides by contacting said mixtures with saturated acyclic or alicyclic hydrocarbons or mixtures thereof with minor amounts of unsaturated hydrocarbons and cooling the organic solvent containing hydrocarbon phase to effect the resolution of said hydrocarbon phase into a polar organic solvent phase and a hydrocarbon solvent phase. In another aspect of this invention, a polyarylene sulfide compound having been contacted with hydrocarbon solvent to remove a polar organic solvent therefrom is further contacted with water or an aqueous acidic solution to remove alkali metal halide therefrom.

It is generally known in the polymer art that the ash or residue content of finished polymers may have a dramatic influence on their chemical, physical and electrical properties. As a result, it is usually desirable to remove, from the finished polymer, impurities produced in the reactor or present in the polymer for whatever reason. It is also necessary in the production of polymers to provide for the separation of polymer and diluent and/or unreacted monomer. The degree of purification desired and consequently the criticality of the separation techniques employed varies with the intended application of the finished polymer and the degree of adverse influence that results from the presence of minor amounts of diluent, catalyst residue, etc. in either the product or recycle process streams; i.e., diluents, etc.

The degree of these influences and the nature of the purification techniques is necessarily determined by the particular polymer or class of polymers, the nature of the particular catalyst residues and other impurities, and the characteristics of the polymerization diluent. For example, in the production of polyarylene sulfide compounds by the reaction of polyhalo-substituted aromatic compounds with alkali metal sulfides in the presence of a polar organic solvent, it is necessary to provide sufficient polymer recovery means for removing alkali metal halides produced during the reaction and the organic diluent from the finished polymer. The requirements of the polymer recovery and purification procedures employed in the production of these polyarylene compounds are critical due to the necessity of removing alkali metal halides from the polymer and the desirability of recovering and purifying the relatively expensive polar organic solvent. For example, the recovery of the arylene sulfide polymer can be accomplished by water extraction as described in copending application Ser. No. 327,143 filed Nov. 27, 1963 now U.S. Patent No. 3,354,129. However, I have found that such procedures necessitate relatively stringent solvent purification facilities in order to avoid the recycle of minor amounts of water to the reaction zone along with the recycled polar organic solvent.

It is therefore one object of this invention to provide a method for recovering polyarylene sulfide compounds from reaction systems in which they are produced. It is another object of this invention to provide a method for removing polar organic solvent and mineral impurities from polyarylene sulfide compounds. It is another object of this invention to provide a method of removing alkali metal halides and polar organic solvents from polyarylene sulfide compounds. It is yet another object of this invention to provide a method for recovering polar organic solvent from polyarylene sulfide compounds and purifying said solvent. It is yet another object of this invention to provide a method for extracting mixtures containing polyarylene sulfides to recover said sulfides. It is yet another object of this invention to provide a method for extracting mixtures comprising polyarylene sulfides in polar organic solvents to purify said sulfides and to recover said solvents. It is yet another object of this invention to recover polar organic solvents from mixtures thereof with polyarylene sulfides. It is yet another object of this invention to provide a method for recovering and purifying polar organic solvents employed in the production of polyarylene sulfide compounds. It is yet another object of this invention to provide a method for recovering polar organic solvent from mixtures thereof with arylene sulfide polymers and alkali metal halides which avoids the contamination of the polar organic solvent with water.

Other aspects, objects and the advantages of this invention will be apparent to one skilled in the art in view of the following disclosure and the appended claims.

The production of the polyarylene sulfide compounds to which this invention relates is disclosed in copending application having Ser. No. 327,143, filed Nov. 27, 1963. The production, utilization and treatment of these compounds is further described in copending application having Ser. No. 492,333, filed Oct. 1, 1965 as a continuation-in-part of Ser. No. 327,143.

According to said copending applications, arylene sulfide polymers can be prepared in high yield by reacting at least one polyhalo-substituted cyclic compound containing unsaturation between adjacent ring atoms and wherein the halogen atoms are attached to ring carbon atoms with an alkali metal sulfide in a polar organic compound at an elevated temperture. Generally the polar organic compound will substantially dissolve both the alkali metal sulfide and the polyhalo-substituted aromatic compound, or other compound which may be present.

The polymers produced by the process of said copending application will vary considerably, depending upon the chosen reactants. Some are high melting thermoplastic materials having excellent high temperature stability, while others can be much lower in molecular weight, including liquids and grease-like materials. The melting point or softening point of these polymers can range all the way from liquids at 25° C. to polymers melting above 400° C. These polymers can be cured, i.e., heat treated in the absence of oxygen or with an oxidizing agent, either under vacuum or at atmospheric or superatmospheric pressures, to increase the molecular weight by either a lengthening of a molecular chain or by crosslinking or by a combination of both to improve such properties as tensile strength. Such treatment can be effected, for example, by heating the polymer preferably to a temperature above its melting point, in some cases as high as 250 to 500° C. Such heat treatment can be carried out while contacting the polymer with air or under vacuum or under an inert gas such as nitrogen.

The polymers produced by the process of said copending application can be molded into a variety of useful articles by molding techniques which are well known in the art. Molding should be carried out above the melting point or softening point but below the decomposition point of the particular polymer being molded. Suitable molding techniques include injection molding, compression molding, vacuum forming, extrusion and the like. The polymers can be molded directly after recovery from the reaction zone in which they are prepared, or such polymers can be subjected to a heat treatment as described above prior to molding. In a further aspect, according to said copending application, heat treatment below the softening point can be utilized for molded items.

In accordance with one embodiment of this invention, a polymerization effluent mixture comprising arylene sulfide polymer, alkali metal halide, polar organic solvent, along with minor amounts of impurities is contacted with a hydrocarbon solvent at a relatively elevated temperature to effect the resolution of the mixture into a more dense phase comprising the arylene sulfide polymer and inorganic contaminants, and a second phase comprising the hydrocarbon solvent and polar organic solvent. The amount of hydrocarbon solvent employed should be sufficient to retain essentially all of the polar organic solvent initially present in the mixture. The hydrocarbon phase is then removed from the arylene sulfide polymer phase and the temperature of the system is reduced by an amount sufficient to effect the resolution of the hydrocarbon phase into two phases, one comprising primarily the hydrocarbon solvent and the other comprising primarily the polar organic solvent. These phases are then separated and the hydrocarbon can be recycled directly to extract additional polar organic solvent from the above-described mixture containing the arylene sulfide polymer, and the polar organic solvent can be reused in the production of arylene sulfide polymers.

The solid or liquid polymer phase recovered from the first contacting step contains the alkali metal halide and other inorganic impurities in addition to the polyarylene sulfide. The alkali metal halide and other inorganic impurities are then removed from the polymer by washing the crude polymer with a solvent having greater affinity for the halide than for the polyarylene sulfide. Water or acidic aqueous solutions such as, for example, aqueous hydrogen chloride, sulfuric acid, etc., have been found very satisfactory for the removal of inorganic residue, particularly the alkali metal halides from the polyaromatic sulfides separated during the first extraction step.

The hydrocarbon solvents employed in the concept of this invention can be either acyclic or alicyclic saturated hydrocarbons having from about 5 to about 20 carbon atoms per molecule. These hydrocarbons can also comprise a minor amount, preferably not more than about 40 weight percent, of unsaturated hydrocarbons, either aromatic or olefin, having from about 5 to about 20 carbon atoms per molecule. However, in the presently preferred embodiment of this invention, the hydrocarbon solvent consists of acyclic saturated hydrocarbons having from about 5 to about 16 carbon atoms and/or saturated alicyclic hydrocarbons having from about 5 to about 12 carbon atoms. Examples of some applicable predominantly saturated hydrocarbons include pentane, hexane, heptane, octane, decane, dodecane, hexadecane, 2-methylhexane, 3-ethyloctane, 2-methyl-6-propylhexadecane, cyclopentane, cyclohexane, cyclooctane, cyclodecane, cyclododecane, methylcyclopentane, ethylcyclohexane, kerosene, Stoddard solvent (ASTM Designation D 484–52), and the like, and mixtures thereof.

The extraction temperature can vary between wide limits depending upon the nature of the hydrocarbon solvent employed, the characteristics of the polyarylene sulfide polymer, the particular polar organic solvent employed during the polymerization, and the relative amounts of each of these. In the presently preferred embodiment of this invention, the arylene sulfide polymer compositions are contacted with the described hydrocarbon at a temperature within the range of from about 100 to about 300° F. The temperature of the hydrocarbon-polar organic solvent phase thus produced is preferably reduced by at least about 40° F., following separation from the polyarylene sulfide phase. This temperature reduction can, of course, be varied considerably, depending upon the desired degree of resolution between the polar organic solvent and hydrocarbon.

The amout of hydrocarbon solvent employed in the initial extraction also depends upon the characteristics of the arylene sulfide polymer composition, as well as the particular hydrocarbon or hydrocarbon mixture employed and the temperature at which the extraction is conducted. However, I have found that adequate resolution of the hydrocarbon solvent and polar organic solvent can be achieved when the volume ratio of hydrocarbon to polar organic solvent is within the range of from about 0.25:1 to about 6:1.

During the primary extraction in which the arylene sulfide polymer and inorganic material are separated from the reaction mixture, a minor amount of a suitable surfactant can be added to expedite the separation or settling of the polymer and inorganic material from the remainder of the mixture. Suitable surfactants are, for example, Tamol–731 (the sodium salt of maleic anhydride-isobutylene copolymer), Triton X–200 (sodium salt of alkyl aryl polyester sulfonate), sulfated alcohols and alcohol derivatives, Dupanol OS (fatty alcohol amine sulfate), Nopco 2031 (sulfated hydroxy stearic acid), Marasperse (calcium lignosulfonate), and many others readily available. Although the concentration of surfactant can vary considerably, it will usually constitute not more than about 0.1 weight percent of the total mixture.

The polyhalo-substituted compounds which can be employed as primary reactants according to said copending application are represented by the formulas:

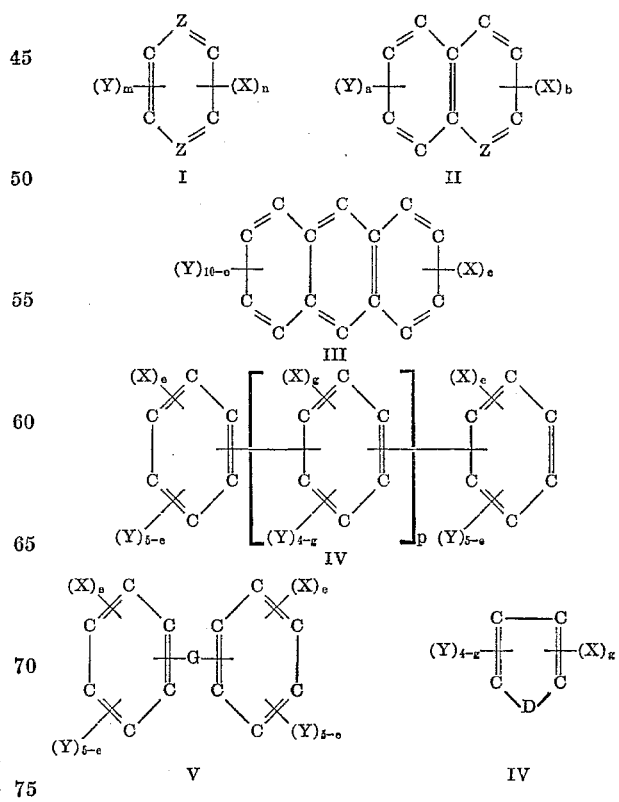

wherein each X is a halogen selected from the group consisting of chlorine, bromine, iodine, and fluorine, preferably chlorine and bromine, each Y is selected from the group consisting of hydrogen, —R, —N(R)$_2$,

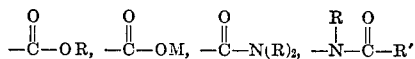

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S—, and

G is selected from the group consisting of

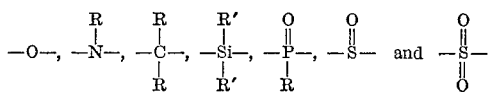

M is an alkali metal selected from the group consisting of sodium, potassium, lithium, rubidium, and cesium; n is a whole integer of from 2 to 6, inclusive; when both Z's in Formula I are —C=, m=6—n, when one Z in Formula I is —C=, m=5—n, when both Z's in Formula I are —N=, m=4—n; b is a whole integer of from 2 to 8, inclusive, when Z in Formula II is —C=, a=8—b, when Z in Formula II is —N=, a=7—b; c is a whole integer of from 2 to 10, inclusive, e is a whole integer of from 1 to 5, inclusive, g is a whole integer of from 2 to 4, inclusive, and p is a whole integer selected from the group consisting of 0 and 1.

The compounds of the above general formulas which are preferred are those which contain not more than three halogen atoms, and more preferably are dihalo-substituted compounds.

The alkali metal sulfides which can be employed in the process of said copending application are represented by the formula M$_2$S wherein M is as defined above, and includes the monosulfides of sodium, potassium, lithium, rubidium and cesium, including the anhydrous and hydrated forms of these sulfides. The preferred sulfide reactant is Na$_2$S and its hydrates. This sulfide can be purchased having 9 mols of water of hydration per mol of Na$_2$S, or it can be obtained containing about 60-62 weight percent Na$_2$S and about 38-40 weight percent water of hydration.

The polar organic compounds which are employed as reaction media in the process of said copending application should be solvents for the polyhalo-aromatic compounds and the alkali metal sulfides. Representative examples of suitable classes of compounds include amides, lactams, sulfones, and the like. Specific examples of such compounds are hexamethylphosphoramide, tetramethylurea, N,N'-ethylene dipyrrolidone, N-methyl-2-pyrrolidone (NMP), pyrrolidone, caprolactam, N-ethylcaprolactam, sulfolane, dimethylacetamide, low molecular weight polyamides and the like.

Some specific examples of polyhalo-substituted compounds of the above general formulas which can be employed in the process of said copending application are: 1,2-dichlorobenzene, 1,3-dichlorobenzene, 1,4-dichlorobenzene, 2,5-dichlorotoluene, 1,4-dibromobenzene, 1,4-diiodobenzene, 1,4-difluorobenzene, 2,5-dibromoaniline, N,N-dimethyl-2,5-dibromoaniline, 1,3,5-trichlorobenzene, 1,2,4-trichlorobenzene, 1,2,4,5-tetrabromobenzene, hexachlorobenzene, 1-n-butyl-2,5-dichlorobenzene, and the like.

EXAMPLE

A mixture of 480 g. (2.0 mols) of sodium sulfide nonahydrate and 1 liter of N-methyl-2-pyrrolidone was heated to remove water of hydration from the sodium sulfide until 359 g. of distillate was collected. The residual solution was transferred to an autoclave and heated to 400° F., after which 400 ml. of N-methyl-2-pyrrolidone, 271 g. (1.8 mols) of p-dichlorobenzene, and 24 g. (0.13 mol) of 1,2,4-trichlorobenzene were added. The mixture was then heated at 500° F. for 3 hours. The resulting slurry was added to 3000 ml. of Stoddard solvent, and the mixture was heated at 176° F., with stirring, for 10 minutes. The polymer and inorganic material were filtered from the hot solution. Upon cooling to room temperature, the filtrate separated into a 600-ml. lower phase comprising predominantly N-methyl-2-pyrrolidone and a 2500-ml. upper phase comprising predominantly Stoddard solvent. The filter cake was then washed with the Stoddard solvent phase by stirring the mixture of filter cake and Stoddard solvent at 176° F. for 10 minutes. The polymer and inorganic material were again filtered from the hot solution. Upon cooling to room temperature, the resulting filtrate separated into a 280-ml. lower phase comprising predominantly N-methyl-2-pyrrolidone and a 2000-ml. upper layer comprising predominantly Stoddard solvent. The filter cake was washed twice with hot water to remove inorganic material, leaving the desired polyaromatic sulfide as a finely divided solid which, upon drying, weighed 190 g.

The hydrocarbon extraction step, as well as the subsequent polar organic solvent purification and polyarylene sulfide purification operations, can be conducted either continuously or as batch operations although continuous operation is preferred. The most effective use of the hydrocarbon solvent during the extraction step is realized where countercurrent operation is employed in which case the hydrocarbon-polar organic solvent phase could be removed as overhead and the solid or liquid polymer phase containing the alkali metal halide and other inorganic impurities could be removed continuously as bottoms product along with a small amount of the supernatant liquid, filtered, dried and water washed as described.

The possibility of the accumulation of contaminant materials in the hydrocarbon phase can be avoided during continuous operation by treating a slipstream of the hydrocarbon medium by suitable means, e.g., fractionation, following the separation of the hydrocarbon phase from the polar organic solvent phase as described. The buildup of impurities in the recycled polar organic solvent stream can be avoided by similar procedures.

Numerous variations and modifications of the concept of this invention will be apparent to one skilled in the art in view of the foregoing disclosure and the appended claims to this invention, the essence of which is that there is provided a method for separating arylene sulfide polymers from compositions containing the same in addition to polar organic solvents and alkali metal halides by contacting the compositions with hydrocarbon to produce a hydrocarbon-polar organic solvent phase and arylene sulfide polymer phase containing inorganic constituents and further extracting the inorganic materials from the polyarylene sulfide.

I claim:

1. A method for separating arylene sulfide polymers from compositions thereof with polar organic solvents and alkali metal halides, which method comprises
 (a) contacting said composition with a hydrocarbon solvent selected from acyclic and alicyclic hydrocarbons having from about 5 to about 20 carbon atoms per molecule at a first temperature and in a quantity sufficient to produce a first phase comprising primarily said polymer and said halide and a second phase comprising primarily said hydrocarbon and said polar organic solvent,
 (b) separating said first and second phases and reducing the temperature of said second phase by an amount sufficient to resolve said second phase into a third phase comprising primarily said polar organic solvent and a fourth phase comprising primarily said hydrocarbon, and (c) contacting said first phase with an aqueous medium selected from water and acidic aqueous solutions having greater affinity for said halide than for said sulfide to extract said halide and recovering said polyarylene sulfide as product.

2. The method of claim 1 wherein said composition is produced by reacting at least one compound selected from the group consisting of:

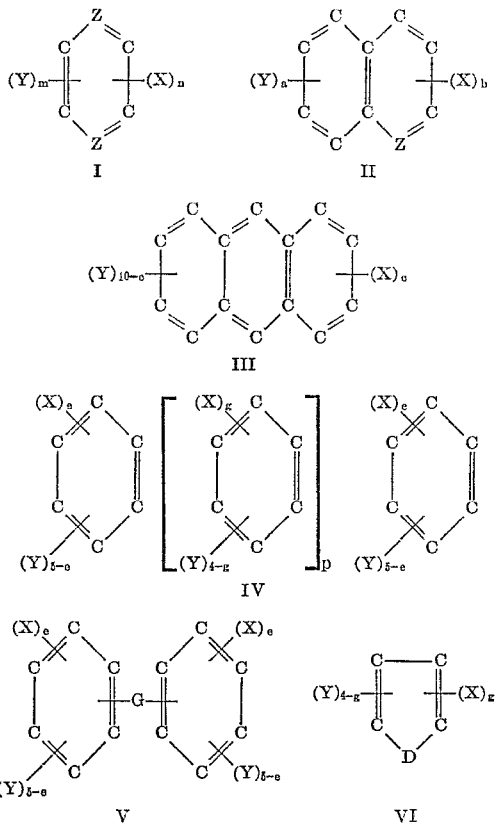

wherein each X is a halogen selected from the group consisting of chlorine, bromine, iodine, and fluorine, preferably chlorine and bromine, each Y is selected from the group consisting of hydrogen, —R, —N(R)$_2$,

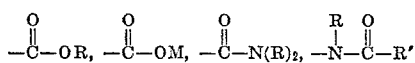

—O—R', —S—R', —SO$_3$H, and —SO$_3$M, wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

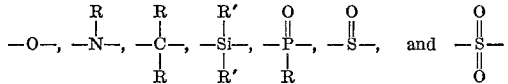

M is an alkali metal selected from the group consisting of sodium, potassium, lithium, rubidium, and cesium; $n$ is a whole integer of from 2 to 6, inclusive; when both Z's in Formula I are —C=, $m=6-n$, when one Z in Formula I is —C=, $m=5-n$, when both Z's in Formula I are —N=, $m=4-n$; $b$ is a whole integer of from 2 to 8, inclusive, when Z in Formula II is —C=, $a=8-b$, when Z in Formula II is —N=, $a=7-b$; $c$ is a whole integer of from 2 to 10, inclusive, $e$ is a whole integer of from 1 to 5, inclusive, $g$ is a whole integer of from 2 to 4, inclusive, and $p$ is a whole integer selected from the group consisting of 0 and 1 with an alkali metal sulfide in a polar organic compound at an elevated temperature for a time sufficient to obtain said polymer.

3. The method of claim 2 wherein said hydrocarbon is selected from the group consisting of saturated acyclic and alicyclic hydrocarbons having from about 5 to about 20 carbon atoms and mixtures thereof, and mixtures of said saturated hydrocarbons with up to about 40 weight percent of unsaturated hydrocarbons having from about 5 to about 20 carbon atoms.

4. The method of claim 3 wherein said hydrocarbon solvent is selected from the group consisting of saturated acyclic hydrocarbons having from about 5 to about 16 carbon atoms, saturated alicyclic hydrocarbons having from about 5 to about 12 carbon atoms, and mixtures thereof.

5. The method of claim 1 wherein said first temperature is within the range of from about 100 to about 300° F. and said temperature of said second phase is reduced by at least about 40° F. below said first temperature.

6. The method of claim 1 wherein said second solvent is selected from the group consisting of water and acidic aqueous solutions.

7. The method of claim 1 wherein the volume ratio of said hydrocarbon to said polar organic solvent is within the range of from about 0.25:1 to about 6:1.

8. The method of claim 1 wherein said polymer is a polyphenylene sulfide, said polar organic solvent is N-methyl-pyrrolidone, said alkali metal halide is sodium chloride, and said hydrocarbon is Stoddard solvent.

References Cited
UNITED STATES PATENTS

| | | | |
|---|---|---|---|
| 2,538,941 | 1/1951 | Macallum | 260—79 |
| 3,268,504 | 8/1966 | Harris et al. | 260—125 |
| 3,274,165 | 9/1966 | Lenz et al. | 260—79 |
| 3,354,129 | 11/1967 | Edmonds et al. | 260—79 |

HOSEA E. TAYLOR, Jr., Primary Examiner

M. I. MARQUIS, Assistant Examiner

U.S. Cl. X.R.

260—79.1, 96, 609